US006804087B2

(12) United States Patent
Wobbe et al.

(10) Patent No.: US 6,804,087 B2
(45) Date of Patent: Oct. 12, 2004

(54) HEAD SUSPENSION ASSEMBLY HAVING AN AIR DEFLECTOR

(75) Inventors: David G. Wobbe, Jordan, MN (US); Markus E. Mangold, Minneapolis, MN (US); Zine Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 40 days.

(21) Appl. No.: 10/313,704

(22) Filed: Dec. 6, 2002

(65) Prior Publication Data

US 2003/0223153 A1 Dec. 4, 2003

Related U.S. Application Data

(60) Provisional application No. 60/383,720, filed on May 28, 2002.

(51) Int. Cl.[7] .............................. G11B 5/60; G11B 17/02
(52) U.S. Cl. .................. 360/245; 360/245.3; 360/97.02
(58) Field of Search .............................. 360/245, 245.3, 360/97.02, 97.03

(56) References Cited

U.S. PATENT DOCUMENTS

| | | | |
|---|---|---|---|
| 2,972,738 A | 7/1958 | Sliter | 340/174.1 |
| 3,713,121 A | 1/1973 | Fasano et al. | 340/174.1 |
| 3,805,290 A | 4/1974 | Thompson | 360/103 |
| 4,028,734 A | 6/1977 | Mos | 360/104 |
| 4,167,765 A | 9/1979 | Watrous | 360/103 |
| 4,245,267 A | 1/1981 | Herman | 360/104 |
| 4,306,258 A | 12/1981 | Higashiyama et al. | 360/99 |
| 4,363,045 A | 12/1982 | Herman | 360/104 |
| 4,422,115 A | 12/1983 | Spash | 360/104 |
| 4,660,110 A | 4/1987 | Iida et al. | 360/98 |
| 4,819,091 A | 4/1989 | Brezoczky et al. | 360/97.01 |
| 4,821,130 A | 4/1989 | Bernett et al. | 360/78.04 |

(List continued on next page.)

FOREIGN PATENT DOCUMENTS

WO    WO 01/88906 A3    11/2001

*Primary Examiner*—Robert S. Tupper
(74) *Attorney, Agent, or Firm*—Westman, Champlin & Kelly

(57) ABSTRACT

A head gimbal assembly (HGA) for use in a forward flow disc drive includes a load beam having a longitudinal axis, a gimbal, a slider, and an air deflector. The gimbal is mounted to a distal end of the load beam. The slider includes a transducing head and is mounted to a disc side of the gimbal and is aligned with the longitudinal axis of the load beam. The air deflector includes a first deflecting member that is positioned upstream of the slider relative to a forward airflow. The air deflector extends from a disc side of either the distal end of the load beam or the gimbal and across the longitudinal axis. The air deflector deflects a portion of the forward airflow away from the slider to thereby reduce windage induced off-track motion of the transducing head.

25 Claims, 7 Drawing Sheets

U.S. PATENT DOCUMENTS

| | | | |
|---|---|---|---|
| 4,858,043 A | 8/1989 | Kadokura et al. | 360/99.01 |
| 4,879,618 A | 11/1989 | Iida et al. | 360/106 |
| 5,008,768 A | 4/1991 | Carlson et al. | 360/104 |
| 5,014,146 A | 5/1991 | Takatsuka et al. | 360/106 |
| 5,063,464 A | 11/1991 | Astheimer et al. | 360/104 |
| 5,115,363 A | 5/1992 | Khan et al. | 360/104 |
| 5,124,864 A | 6/1992 | Matsuzaki | 360/104 |
| 5,126,904 A | 6/1992 | Sakurai | 360/104 |
| 5,187,625 A | 2/1993 | Blaeser et al. | 360/104 |
| 5,200,869 A | 4/1993 | Matsuzaki | 360/103 |
| 5,218,496 A | 6/1993 | Kaczeus | 360/106 |
| 5,526,203 A | 6/1996 | Mohajerani et al. | 360/97.02 |
| 5,541,791 A | 7/1996 | Yamasaki et al. | 360/105 |
| 5,557,488 A | 9/1996 | Hamilton et al. | 360/104 |
| 5,629,820 A | 5/1997 | Koriyama | 360/104 |
| 5,696,649 A | 12/1997 | Boutaghou | 360/97.03 |
| 5,701,218 A | 12/1997 | Boutaghou | 360/104 |
| 5,796,556 A | 8/1998 | Boutaghou | 360/104 |
| 5,850,319 A | 12/1998 | Tangren | 360/104 |
| 5,854,725 A | 12/1998 | Lee | 360/106 |
| 5,877,920 A | 3/1999 | Resh | 360/104 |
| 5,898,545 A | 4/1999 | Schirle | 360/105 |
| 5,933,293 A | 8/1999 | Bennin | 360/104 |
| 5,970,038 A | 10/1999 | Boutaghou et al. | 369/112 |
| 5,999,372 A | 12/1999 | Peterson et al. | 360/106 |
| 6,011,670 A | 1/2000 | Balsley, Jr. et al. | 360/97.01 |
| 6,021,022 A | 2/2000 | Himes et al. | 360/104 |
| 6,046,884 A | 4/2000 | Crane | 360/104 |
| 6,097,568 A | 8/2000 | Ekhoff | 360/97.02 |
| 6,128,164 A | 10/2000 | Kant et al. | 360/244.5 |
| 6,157,520 A | 12/2000 | Mangold et al. | 360/255 |
| 6,181,525 B1 | 1/2001 | Carlson | 360/245.7 |
| 6,201,668 B1 | 3/2001 | Murphy | 360/294.4 |
| 6,289,564 B1 | 9/2001 | Novotny | 29/25.35 |
| 6,362,542 B1 | 3/2002 | Novotny | 310/12 |
| 6,366,430 B1 | 4/2002 | Narayan et al. | 360/244.9 |
| 6,366,432 B1 | 4/2002 | Tadepalli et al. | 360/266 |
| 6,369,978 B1 | 4/2002 | Shimizu et al. | 360/97.03 |
| 6,388,842 B1 | 5/2002 | Murphy | 360/244.8 |
| 6,392,842 B1 | 5/2002 | Boutaghou et al. | 360/236.6 |
| 6,396,667 B1 | 5/2002 | Zhang et al. | 360/294.3 |
| 6,411,470 B1 | 6/2002 | Hamilton et al. | 360/246.1 |
| 6,422,080 B1 | 7/2002 | Lalouette | 73/579 |
| 6,545,842 B2 * | 4/2003 | Rao et al. | 360/97.02 |
| 6,549,365 B1 * | 4/2003 | Severson | 360/97.02 |
| 6,560,065 B1 * | 5/2003 | Yang et al. | 360/97.02 |
| 6,624,966 B1 * | 9/2003 | Ou-Yang et al. | 360/97.02 |
| 2001/0050828 A1 | 12/2001 | Davis et al. | 360/97.01 |
| 2002/0051323 A1 | 5/2002 | Rancour et al. | 360/245.3 |

* cited by examiner

HEAD SUSPENSION ASSEMBLY HAVING AN AIR DEFLECTOR

CROSS-REFERENCE TO RELATED APPLICATION

This application claims priority from U.S. Provisional Application No. 60/383,720 filed on May 28, 2002 for inventors David Gerard Wobbe, Markus Erwin Mangold and Zine Eddine Boutaghou and entitled "WINDAGE DISTURBANCE SPOILER FOR MICRO-ACTUATORS."

FIELD OF THE INVENTION

The present invention relates generally to forward flow disc drive storage systems and more particularly, but not by limitation, to a head gimbal assembly for use in a forward flow disc drive that includes an air deflector that operates to reduce windage induced off-track motion.

BACKGROUND OF THE INVENTION

Disc drives are used as primary data storage devices in modern computer systems and networks. Disc drives use one or more rigid magnetic discs for storage of digital information in a plurality of circular, concentric data tracks, which are defined by servo information written to the disc surfaces. The discs are mounted on a spindle motor which rotates the discs. Transducing heads carried by sliders of head gimbal assemblies (HGA's) are used to read data from, and write data to, the surfaces of the discs.

The HGA's each include a load beam, a gimbal and the slider. The load beam includes a flexible beam portion at a proximal end and a rigid beam section at a distal end, to which the gimbal is attached. The rigid beam section of the load beam transfers a pre-load force from the flexible beam portion to the slider which directs the slider toward the disc surface. The slider is joined to the rigid beam section by the gimbal. During operation, the discs rotate at high speed, which generates an airflow that is generally parallel to and in the direction of rotation of the discs. In forward flow disc drives, the generated airflow travels from the proximal end of the load beam toward the distal end where the slider and gimbal are located. Each slider is configured with aerodynamic features that ride on an air bearing established by the airflow. The height at which the slider rides the air bearing is limited by the pre-load force generated by the load beam. The gimbal allows the slider to pitch and roll in response to variations in the air bearing.

Disc drives utilize servo systems to control the position of the transducing head relative to a desired data track using the servo information recorded to the disc surface. As the transducing head travels over a disc surface, it reads the servo information and produces an output signal that indicates its position relative to the tracks. The output signal is demodulated and compared with a reference position signal, relating to a desired track position, to produce a position error signal (PES). The PES is provided to a servo controller that outputs a control signal to an actuator mechanism. The actuator mechanism is connected to the HGA's by track accessing arms and moves the transducing heads toward the desired position or data track in response to the control signal.

There is a continuing trend in the disc drive industry to provide successive generations of disc drives with ever increasing data storage capacity and data transfer rates. Because the amount of disc surface available for the recording of data remains substantially constant (or even decreases as disc drive form factors become smaller), substantial advancements in areal recording densities, both in terms of the number of bits that can be recorded on each track as well as the number of tracks on each disc (measured as tracks per inch or TPI), are continually being made in order to facilitate such increases in data storage capacity. Additionally, efforts are being made to increase data access speeds and provide higher data transfer rates in disc drives.

One way of achieving faster data access and transfer rates is by increasing the rotational speed of the discs. Unfortunately, as the rotational velocity of the discs is increased, the airflows in the disc drive increase in velocity and become more turbulent. Such turbulent airflows, or windage, randomly impact the slider causing the supported transducing head to deviate from the desired track-following path. This off-track movement of the transducer interrupts disc drive read and write operations and produces random non-repeatable runout (NRRO) off-track error in the PES, which cannot be compensated for. As a result, disc drive read and write operations can be temporarily interrupted when the transducing head is moved off-track due to the high energy windage impacting the slider.

Such interruptions of disc drive operations can be reduced by including a microactuator in the HGA controlled by a high performance servo controller. These components provide quick adjustment to the position of the slider/transducer in response to windage induce movement and reduce the duration of interruptions to the read and write operations. However, in addition to making the disc drive more expensive, the constant monitoring and repositioning of the transducing head using the microactuator and servo controller require a great deal of energy over time, which reduces the operational runtime of battery powered systems.

Further advancements in disc drive design are required to improve current disc drive performance by reducing windage induced off-track motion of the transducing heads. Embodiments of the present invention provide solutions to this and other problems, and offer other advantages over the prior art.

SUMMARY OF THE INVENTION

The present invention is directed to a head gimbal assembly (HGA) for use in a forward flow disc drive that operates to reduce windage induced off-track motion of a supported transducing head. The HGA generally includes a load beam having a longitudinal axis and a disc side, a gimbal, a slider, and an air deflector. The gimbal is mounted to a distal end of the load beam. The slider includes a transducing head and is mounted to a disc side of the gimbal and is aligned with the longitudinal axis of the load beam. The air deflector includes a first deflecting member that is positioned upstream of the slider relative to a forward airflow. The air deflector extends from the disc side of either the distal end of the load beam or the gimbal, and across the longitudinal axis. The air deflector deflects a portion of the forward airflow away from the slider to thereby reduce windage induced off-track motion of the transducing head.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
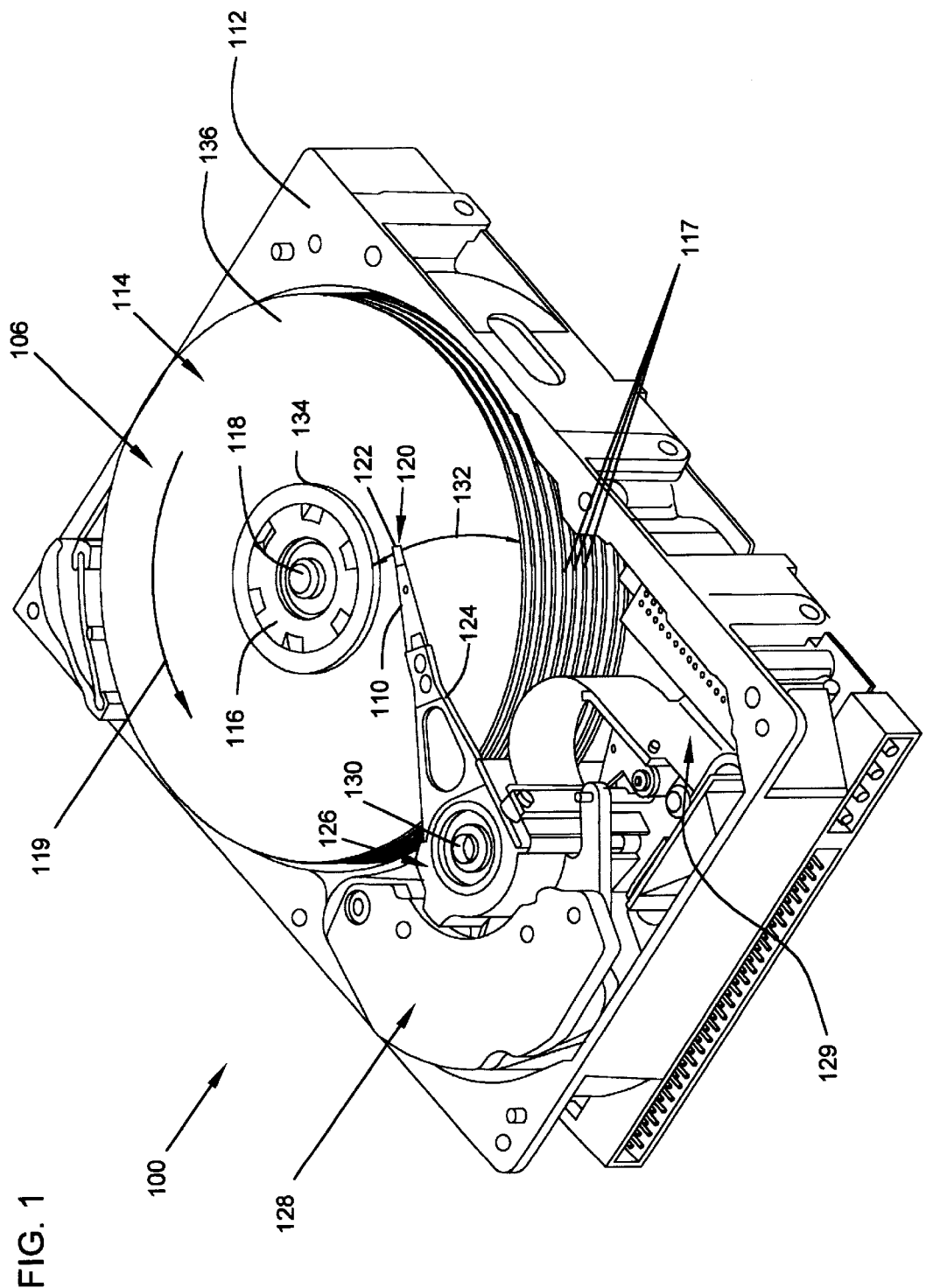
FIG. 1 is an isometric view of a disc drive in accordance with one embodiment of the present invention.

FIG. 1 is an isometric view of a forward flow disc drive 100 that includes a head gimbal assembly (HGA) 110, in accordance with embodiments of the invention. Disc drive 100 also includes a housing with a base 112 and a top cover (not shown) and a disc pack 114, which is mounted on a spindle motor (not shown) by a disc clamp 116. Disc pack 114 includes a plurality of individual discs 117 which are mounted for co-rotation about central axis 118 in the direction indicated by arrow 119. The rotation of discs 117 produces a forward airflow in disc drive 100 that is generally parallel to discs 117 and in the direction of rotation 119 of the discs. HGA 110 includes a slider 120 that carries a transducing head 122, which can read data from, and write data to, each disc surface. HGA's 110 are attached to track accessing arms 124 of actuator 126. Actuator 126 can be any suitable type, but is depicted as a rotary moving coil actuator that includes a voice coil motor, shown generally at 128. Voice coil motor 128, operating under the control of circuitry 129, rotates actuator 126 and the attached transducing heads 122 about a pivot shaft 130 to position heads 122 over a desired data track along a path 132 between a disc inner diameter 134 and a disc outer diameter 136.

Figure 3:
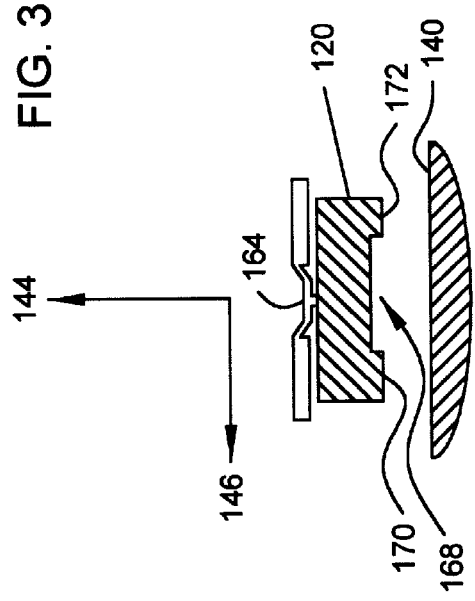
FIG. 3 shows a cross-sectional view of view of a head gimbal assembly in accordance with one embodiment of the invention, taken at line 3—3 of FIG. 2.
Figure 2:
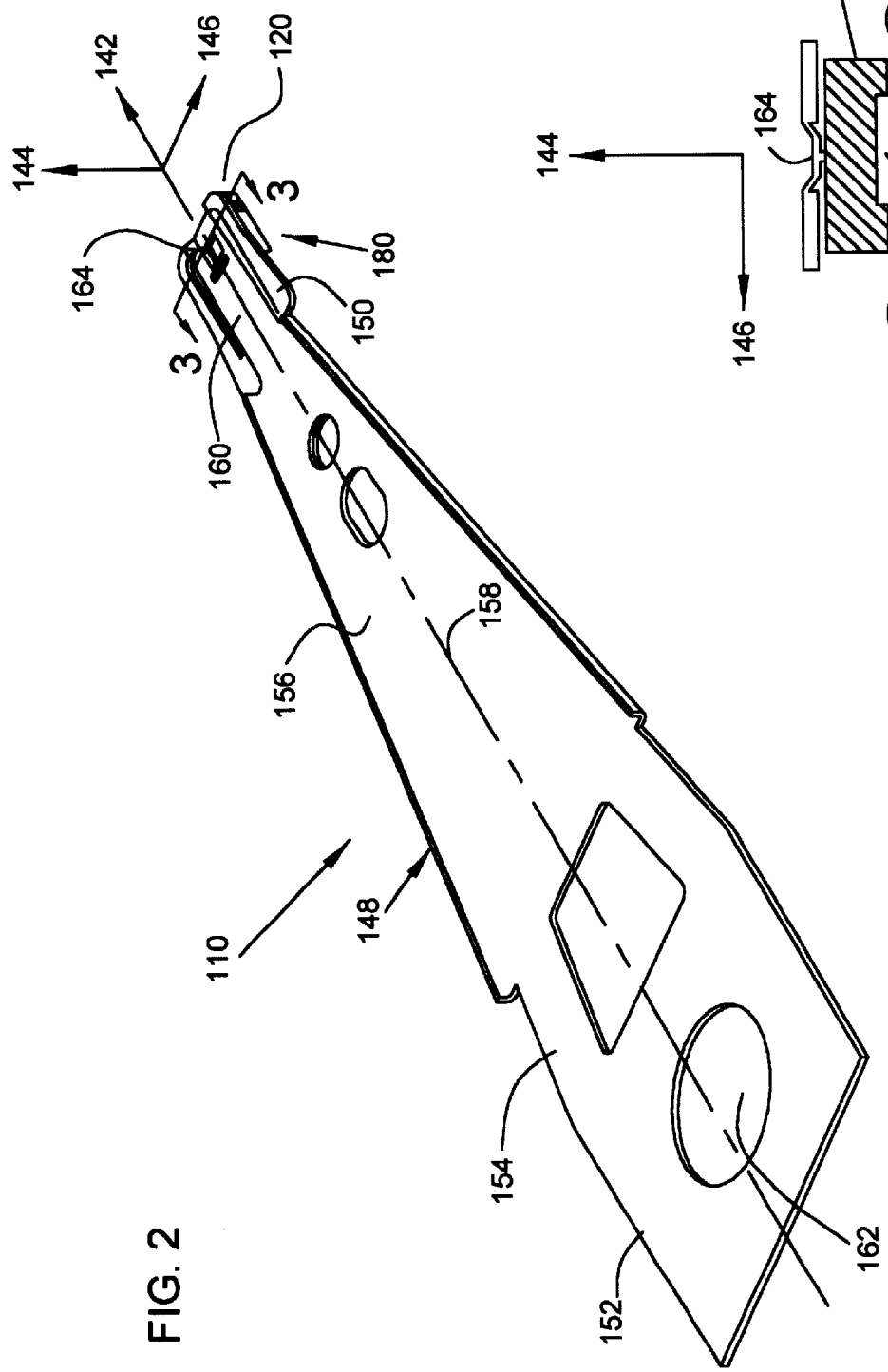
FIG. 2 shows an isometric view of a head gimbal assembly in accordance with one embodiment of the invention.

FIG. 2 shows a perspective view of an example of HGA 110 and FIG. 3 shows a simplified cross-sectional view of HGA 110, taken generally along line 3—3 of FIG. 2. Also shown in FIGS. 2 and 3 are x-axis 142, y-axis 144, and z-axis 146. HGA 110 also includes a load beam 148 and a gimbal 150. Load beam 148 generally includes a mounting portion 152, a flexible beam portion 154, a rigid beam section 156, a flexure arm 160, and a longitudinal axis 158 aligned with x-axis 142. Mounting portion 152 includes a swage hole 162 that mounts to track accessing arm 124 (FIG. 1) through a base plate (not shown). Each slider 120 is configured with aerodynamic features 168 that face disc surface 140 and allow slider 120 to ride on an air bearing established by the forward airflow that generally travels in the positive direction of x-axis 142 (FIG. 2) when discs 117 are rotated, as shown in FIG. 3. For example, a conventional catamaran slider includes an air-bearing surface 168 that includes a pair of raised side rails 170 and 172 which face disc surface 140, as shown in FIG. 3. Flexible beam portion 154 applies a pre-load force to slider 120 through rigid beam section 156 and flexure arm 160 to limit the fly height of slider 120. The pre-load force is preferably applied to slider 120 at a dimple 164 of flexure arm 160. Gimbal 150 connects slider 120 to a distal end 174 of load beam 148 and allows slider 120 to pitch (rotate about the z-axis 146) and roll (rotate about longitudinal axis 158 or the x-axis 142) while following the variations in the air bearing produced by the forward airflow.

The forward airflow includes turbulent currents or windage. The windage randomly impacts slider 120 or gimbaled region 180 of HGA 110 causing the transducing head 122 to be diverted from the track it is following. The resulting off-track motion of slider 120 can result in a temporary interruption of a reading or writing operation resulting in reduced disc drive performance.

Figure 4:
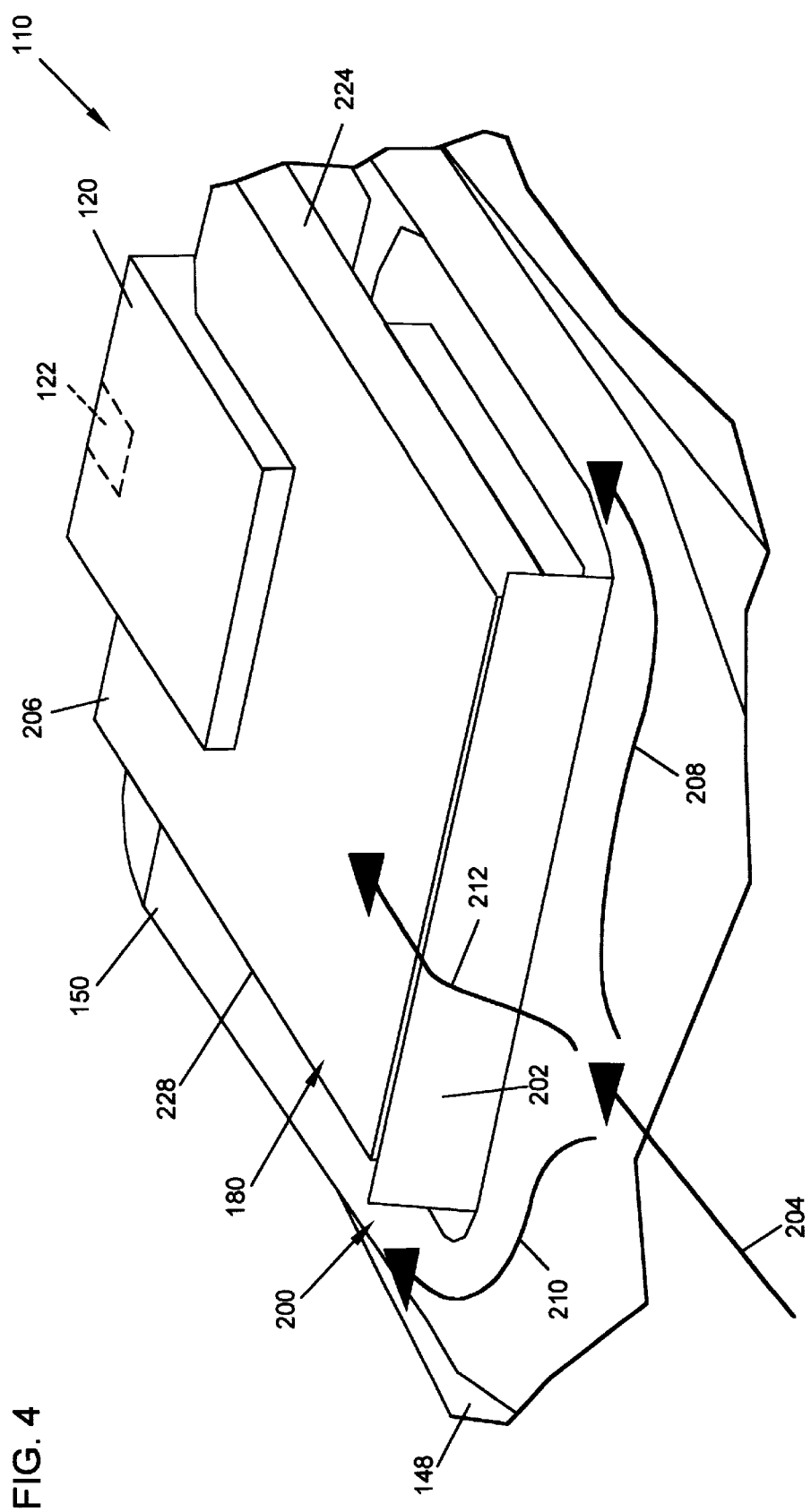
FIG. 4 is a simplified bottom partial isometric view of a distal end of a head gimbal assembly in accordance with the present invention.
Figure 5:
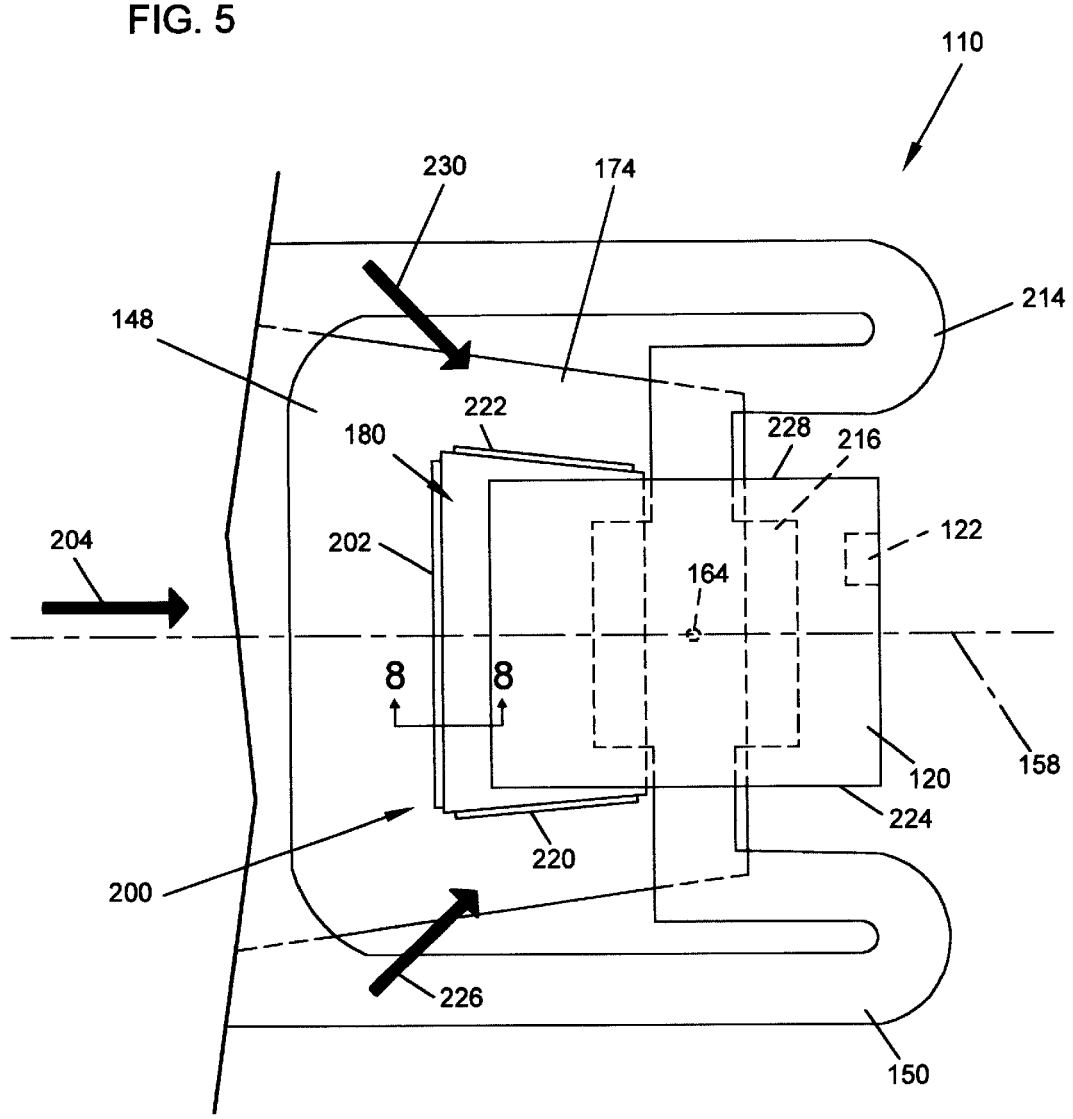
FIGS. 5–7 are simplified bottom plan views of a head gimbal assembly in accordance with various embodiments of the invention.
Figure 6:
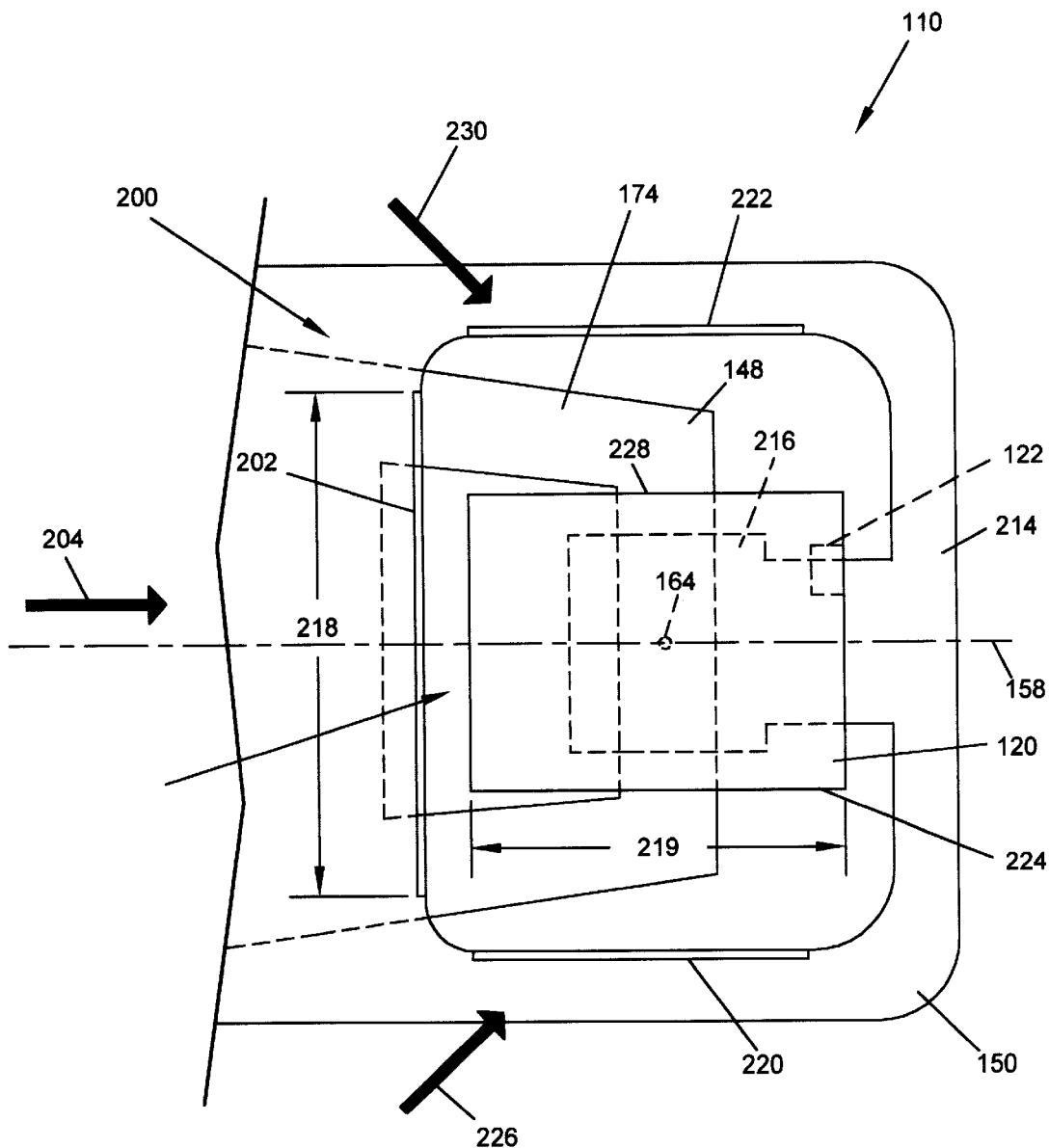
Figure 7:
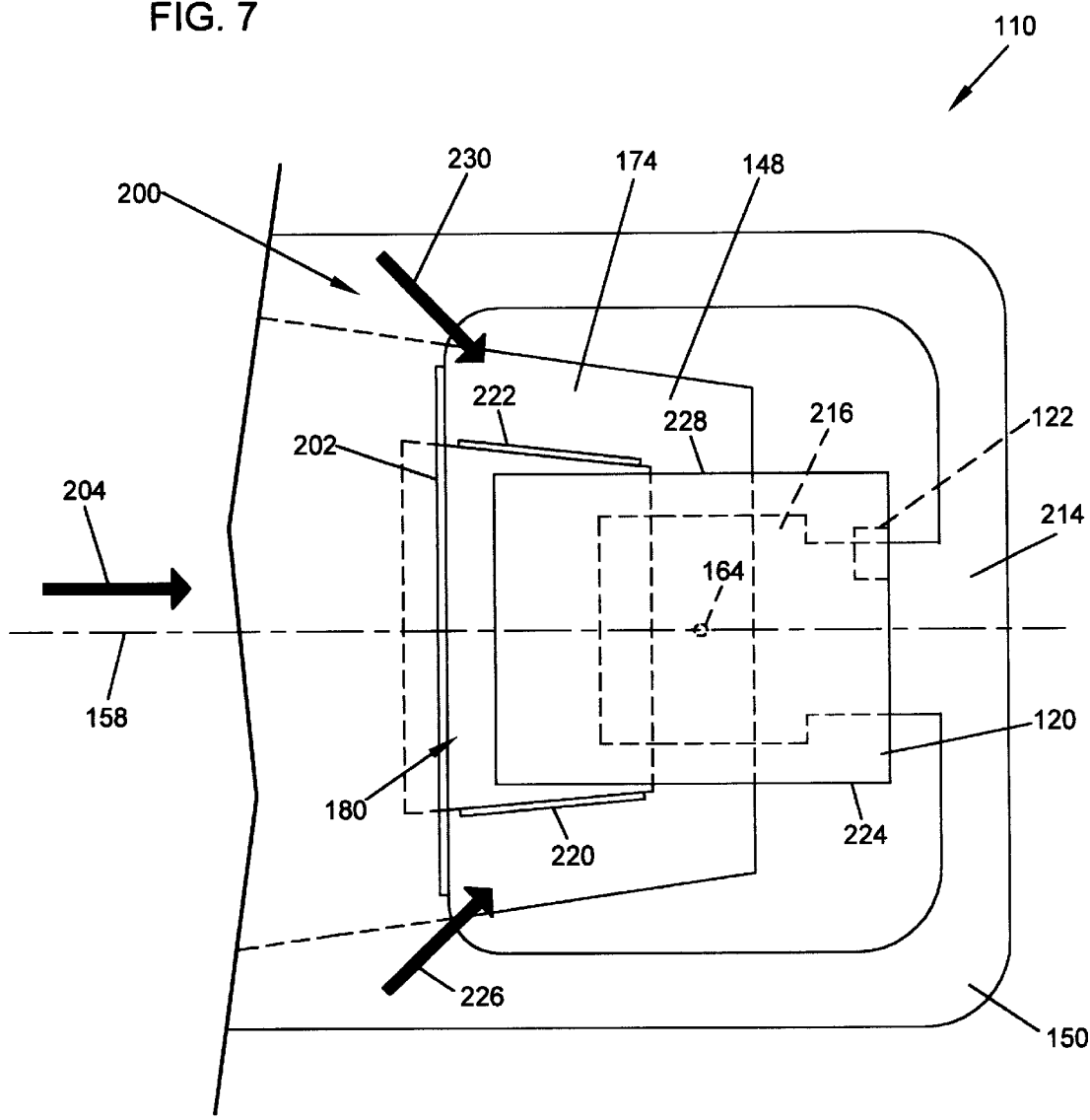

HGA 110 of the present invention includes an air deflector 200 that operates to reduce windage excitation of the slider 120 and thereby reduce undesirable off-track movement of transducing head 122 in forward flow disc drive 100 resulting in improved disc drive performance. FIG. 4 is a simplified bottom partial isometric view of distal end 174 of HGA 110, and FIGS. 5–7 are simplified bottom plan views of HGA 110, having an air deflector 200 in accordance with various embodiments of the invention. In general, air deflector 200 includes a first deflecting member 202 that prevents gimbaled region 180, where slider 120 is located, from receiving the full brunt of forward airflow 204 that would otherwise, in conventional disc drives, directly impact slider 120 and other components in gimbaled region 180. Gimbaled region can include sensors and a microactuator 206 (FIG. 4) that can move transducing head 122 along z-axis 146 relative to a desired track in response to a tracking control signal. As shown in FIG. 4, first deflecting member 202 is mounted upstream of gimbaled region 180 and deflects portions of airflow 204 around the sides of gimbaled region 18 as indicated by arrows 208 and 210, and between gimbaled region 180 and disc surface 140 (FIG. 3) as indicated by arrow 212, while still allowing enough of airflow 204 to pass under slider 120 to form the air bearing on which slider 120 rides. In this manner, the full brunt of forward airflow 204 on gimbaled region 180 and slider 120 is avoided, which would otherwise induce off-track motion of transducing head 122.

As shown in FIGS. 5–7, slider 120 is mounted to a disc side 214 of gimbal 150 at a bond tab 216 and is substantially aligned with longitudinal axis 158 of load beam 148. First deflecting member 202 extends from disc side 214 of HGA 110 (side facing disc surface 140 shown in FIG. 3) of either distal end 174 of load beam 148, as shown in FIG. 5, or gimbal 150, as shown in FIG. 6. First deflecting member 202 also extends across longitudinal axis 158. First deflecting member 202 preferably has a length 218 that is at least as long as a width 220 of slider 120, as shown in FIG. 6.

In accordance with other embodiments of the invention, air deflector 200 includes one or more additional deflecting members 220 or 222 to provide further protection to gimbaled region 180 and slider 120 from high energy windage of forward airflow 204. Deflecting member 220 runs alongside an inwardly facing side 224 of slider 120 and gimbaled region 180, which faces inner diameter 134 of discs 117 (FIG. 1), and deflects portions of airflow 204, indicated by arrow 226, from directly impacting slider 120 and gimbaled region 180. The magnitude of airflow 226 is greatest when slider 120 is positioned toward inner diameter 134 of disc 117. Deflecting member 222 runs alongside an outwardly facing side 228 of slider 120 and gimbaled region 180, which faces outer diameter 136 of discs 117, and deflects portions of airflow 204, indicated by arrow 230, from directly impacting slider 120 and gimbaled region 180. The magnitude of airflow 230 is greatest when slider 120 is positioned toward outer diameter 136 of disc 117. Additional deflecting members can be formed to extend across gaps between deflecting member 202 and deflecting members 220 and 222 to further reduce the windage impact on gimbaled region 180.

Deflecting members 220 and 222 can be formed as members of either load beam 148, as shown in FIG. 5, or gimbal 150, as shown in FIG. 6. Additionally, where first deflecting member 202 is formed as a member of gimbal 150, deflecting members 220 and 222 can be formed as members of load beam 148, as illustrated in FIG. 7, or vice versa. Thus, deflecting member 220 can extend from either disc side 214 of distal end 174 of load beam 148 (FIGS. 5 and 7) or disc side 214 of gimbal 150 (FIG. 6). Similarly, deflecting member 222 can extend from either disc side 214 of distal end 174 of load beam 148 (FIGS. 5 and 7) or disc side 214 of gimbal 150 (FIG. 6).

Figure 8:
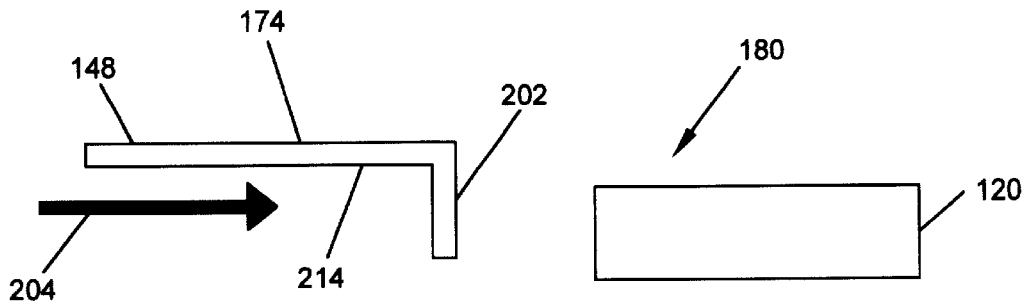
FIGS. 8–11 are simplified side cross-sectional views of embodiments of an air deflector of a head gimbal assembly taken generally along line 8—8 of FIG. 5 along with a slider, as viewed with the head gimbal assembly in an upright position.
Figure 9:
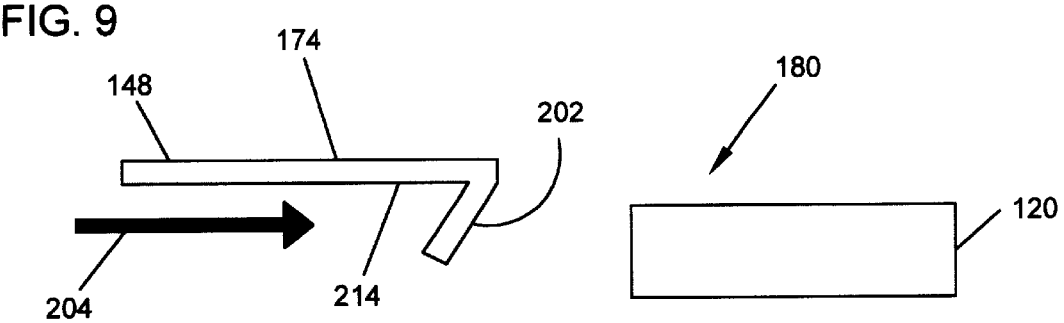
Figure 10:
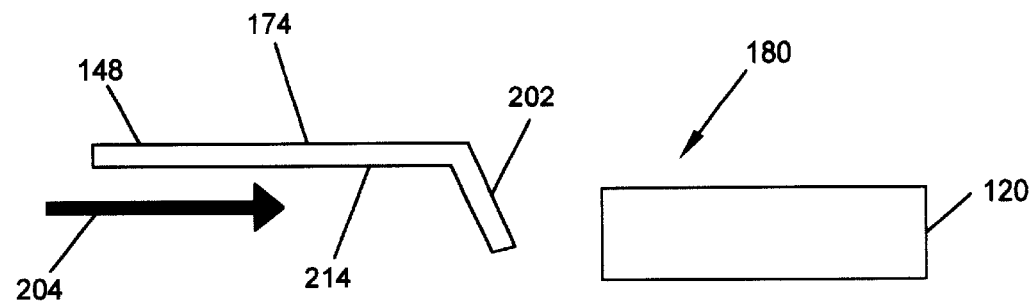
Figure 11:
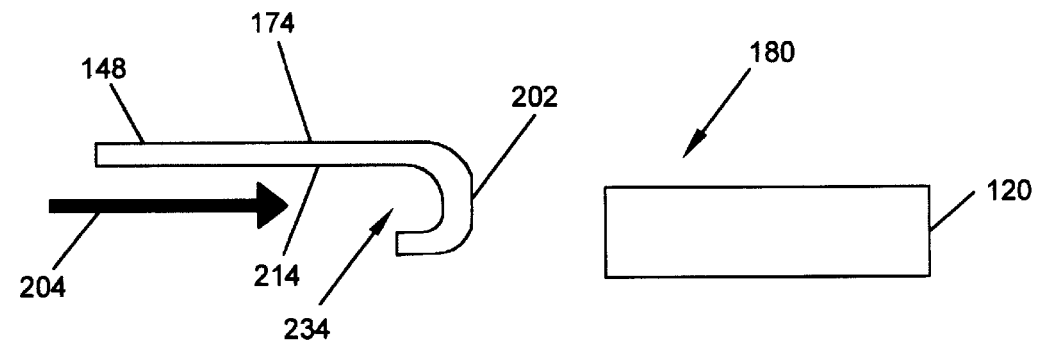

Deflecting members 202, 220 and 222 can have various cross-sectional shapes. Examples of such cross-sectional shapes in accordance with the invention are depicted in FIGS. 8–11, which are simplified side cross-sectional views HGA 110 in an upright position taken generally along line 8—8 of FIG. 5, along with slider 120. In accordance with one embodiment, deflecting member 202 is oriented substantially perpendicular to disc side 214 of load beam 148, as shown in FIG. 8. Alternatively, deflecting member 202 can be angled in either an upstream direction, as shown in FIG. 9, or in a downstream direction, as shown in FIG. 10, relative to airflow 204. In yet another embodiment, deflecting member 202 has a hook shaped cross-section, such as that depicted in FIG. 11. The hook shape forms an air channel 232 that faces in an upstream direction relative to airflow 204.

Deflecting members 202, 220 and 222 are preferably formed in accordance with conventional machining processes. For example, the deflecting members can initially be formed as a tab member of load beam 148 or gimbal 150 and subsequently bent to extend from disc side 214 and have the desired cross-sectional shape.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A head gimbal assembly for use in a forward flow disc drive, in which a forward airflow is generated due to rotating discs, the head gimbal assembly comprising:
   a load beam having a longitudinal axis and a disc side;
   a gimbal mounted to a distal end of the load beam;
   a slider mounted to a disc side of the gimbal and aligned with the longitudinal axis and having a transducing head; and
   an air deflector having a first deflecting member upstream of the slider relative to the airflow and extending from the disc side of either the distal end of the load beam or the gimbal, and across the longitudinal axis.

2. The head gimbal assembly of claim 1, wherein the first deflecting member has a length that is at least as long as a width of the slider.

3. The head gimbal assembly of claim 1, wherein the first deflecting member is oriented substantially perpendicular to the disc side of either the load beam or the gimbal.

4. The head gimbal assembly of claim 1, wherein the first deflecting member is angled in either an upstream or a downstream direction relative to the airflow.

5. The head gimbal assembly of claim 1, wherein the first deflecting member has a hook shaped cross-section that defines an air channel facing in an upstream direction relative the airflow.

6. The head gimbal assembly of claim 1, wherein the air deflector includes a second deflecting member extending from the disc side of either the distal end of the load beam or the gimbal, and running alongside an inwardly facing side of the slider.

7. The head gimbal assembly of claim 6, wherein the air deflector includes a third deflecting member extending from the disc side of either the distal end of the load beam or the gimbal, and running alongside an outwardly facing side of the slider.

8. The head gimbal assembly of claim 1, wherein the air deflector includes a second deflecting member extending from the disc side of either the distal end of the load beam or the gimbal, and running alongside an outwardly facing side of the slider.

9. A forward flow disc drive storage system comprising:
   a disc that generates a forward air flow when rotated;
   a track accessing arm supported over the disc; and
   a head gimbal assembly comprising:
      a load beam having a longitudinal axis and a disc side;
      a gimbal mounted to a distal end of the load beam;
      a slider mounted to a disc side of the gimbal and aligned with the longitudinal axis and having a transducing head; and
      an air deflector having a first deflecting member upstream of the slider relative to the airflow and extending from the disc side of either the distal end of the load beam or the gimbal, and across the longitudinal axis.

10. The disc drive storage system of claim 9, wherein the first deflecting member has a length that is at least as long as a width of the slider.

11. The disc drive storage system of claim 9, wherein the first deflecting member is oriented substantially perpendicular to the disc side of either the load beam or the gimbal.

12. The disc drive storage system of claim 9, wherein the first deflecting member is angled in either an upstream or a downstream direction relative to the airflow.

13. The disc drive storage system of claim 9, wherein the first deflecting member has a hook shaped cross-section that defines an air channel facing in an upstream direction relative the airflow.

14. The disc drive storage system of claim 9, wherein the air deflector includes a second deflecting member extending from the disc side of either the distal end of the load beam or the gimbal, and running alongside an inwardly facing side of the slider.

15. The disc drive storage system of claim 14, wherein the air deflector includes a third deflecting member extending from the disc side of either the distal end of the load beam or the gimbal, and running alongside an outwardly facing side of the slider.

16. The disc drive storage system of claim 9, wherein the air deflector includes a second deflecting member extending from the disc side of either the distal end of the load beam or the gimbal, and running alongside an outwardly facing side of the slider.

17. A head gimbal assembly for use in a forward flow disc drive, in which a forward airflow is generated due to rotating discs, the head gimbal assembly comprising:
   a load beam having a longitudinal axis and a disc side;
   a gimbal mounted to a distal end of the load beam;

a slider mounted to a disc side of the gimbal and aligned with the longitudinal axis and having a transducing head; and an air deflecting means positioned upstream of the slider for deflecting a portion of the airflow away from the slider.

18. The head gimbal assembly of claim 17, wherein the air deflecting means includes an air deflector having a first deflecting member upstream of the slider relative to the airflow and extending from the disc side of either the distal end of the load beam or the gimbal, and across the longitudinal axis.

19. The head gimbal assembly of claim 18, wherein the first deflecting member has a length that is at least as long as a width of the slider.

20. The head gimbal assembly of claim 18, wherein the first deflecting member is oriented substantially perpendicular to the disc side of either the load beam or the gimbal.

21. The head gimbal assembly of claim 18, wherein the first deflecting member is angled in either an upstream or a downstream direction relative to the airflow.

22. The head gimbal assembly of claim 18, wherein the first deflecting member has a hook shaped cross-section that defines an air channel facing in an upstream direction relative the airflow.

23. The head gimbal assembly of claim 18, wherein the air deflector includes a second deflecting member extending from the disc side of either the distal end of the load beam or the gimbal, and running alongside an inwardly facing side of the slider.

24. The head gimbal assembly of claim 23, wherein the air deflector includes a third deflecting member extending from the disc side of either the distal end of the load beam or the gimbal, and running alongside an outwardly facing side of the slider.

25. The head gimbal assembly of claim 18, wherein the air deflector includes a second deflecting member extending from the disc side of either the distal end of the load beam or the gimbal, and running alongside an outwardly facing side of the slider.

* * * * *